Figure 1:
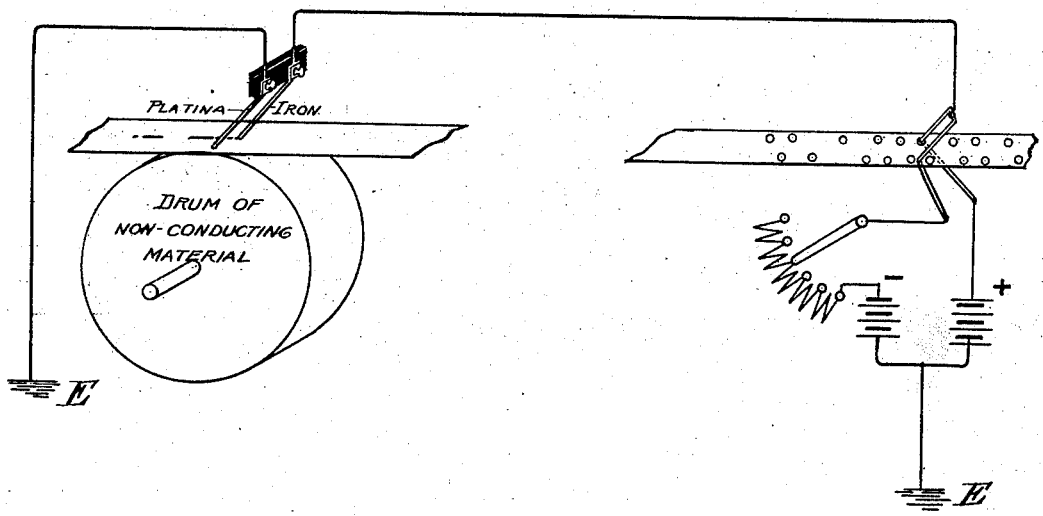

No. 720,004. PATENTED FEB. 10, 1903.
P. B. DELANY.
TELEGRAPHY.
APPLICATION FILED MAR. 18, 1901.

NO MODEL.

Witnesses
Geo. B Rowley,
Wm A Stahlin.

Patrick B. Delany Inventor
By his Attorneys
Baldwin, Davidson & Wight

UNITED STATES PATENT OFFICE.

PATRICK B. DELANY, OF SOUTH ORANGE, NEW JERSEY.

TELEGRAPHY.

SPECIFICATION forming part of Letters Patent No. 720,004, dated February 10, 1903.

Application filed March 18, 1901. Serial No. 51,618. (No model.)

*To all whom it may concern:*

Be it known that I, PATRICK B. DELANY, a citizen of the United States, residing at South Orange, county of Essex, State of New Jersey, have invented certain new and useful Improvements in Telegraphy, of which the following is a specification.

This invention relates, primarily, to that system of telegraphy in which transmitted impulses representing dots and dashes are recorded by a chemical receiver, and is particularly applicable to a system of that character wherein the matter to be transmitted is prepared on a strip of paper or ribbon by perforations or embossings, the strip being used to automatically transmit the matter at high speed. The invention, however, may be used in connection with other methods of transmission, whether manual or mechanical.

The "capacity" and consequent retardation of relatively long lines or cable-circuits has been a serious obstacle to transmission and chemical reception of signals at high speed, causing elongation of the characters to such extent frequently that the dots and dashes run into each other.

The present invention proposes to utilize the heretofore objectionable "retardation" of a circuit as an element in producing the record upon the receiving-ribbon and contemplates adding capacity or retardation artificially when required in the operation of this invention. Each signal transmitted, whether it be a dot or dash, is composed of two impulses of opposite polarity, one of which initiates a record of the signal and the other terminates it, the interval between the two impulses determining whether the signal is a dot or a dash. When the primary impulse of a signal is transmitted, it initiates a record of that signal on a chemically-prepared receiving-tape, and after disconnection of the transmitting-generator from the circuit the formation of the record character on the receiving-tape will be continued by the capacity effects of the circuit, but will be terminated by the secondary impulse of opposite polarity, which is preferably not otherwise manifested upon the receiving-ribbon. The character produced upon the receiving-ribbon will therefore be short or long—*i. e.*, either a dot or a dash—according to the interval elapsing between the primary and secondary impulses constituting a signal. As is apparent, the primary impulses may be of uniform duration. The secondary impulses may also be of uniform duration and of the same duration as the primary impulses. The primary and secondary impulses may be of the same strength or the secondary impulses may be of reduced strength, as may be determined to produce the best results over any given circuit. The intervals between the primary and secondary impulses representing dots and dashes depend in a measure upon the rate at which the impulses are sent into the circuit and upon the speed of travel of the receiving-ribbon. The initial impulses of the signals being of uniform duration, dots only from such impulses would be produced on the chemically-prepared receiving-ribbon if the capacity or retardation of the circuit be so small as not to cause their elongation, and therefore I propose in such a case to increase the capacity artificially to such extent as to produce a proper legible record in dots and dashes. Where under the conditions of working, including the elements of strength of current employed and speed of transmission, capacity should be added to the circuit, it is best done at the receiver, the character of the record being an efficient index of the change required in the condition of the circuit. It is desirable that the receiving-ribbon shall contain no characters other than the dots and dashes representing the message received, as the presence of other characters tends to confusion and error in transcribing the record, and therefore I prefer that the secondary or signal-terminating impulses shall not be recorded or made manifest in any way except in so far as they terminate the record characters, and thereby afford a sharp, well-defined, and legible record.

I have demonstrated that by the use of a perforated transmitting-strip I may send into a circuit of very large capacity signals at a high rate of speed and obtain sharp clear definition of the characters recorded upon the receiving-ribbon.

In machine or automatic telegraphy where transmitting-ribbons are employed various modes of sending alternating currents separated by proper intervals may be adopted.

The invention is not dependent upon any special mode, many of which are known. Proper results may be produced by arrangement and spacing of the perforations or embossings and also by proper relative arrangements of the contact fingers or devices operated by the transmitting-ribbon.

In the accompanying drawings I have shown diagrammatically one way of practicing this invention which experience has demonstrated to be practical and efficient, but to which the invention is in no wise limited.

Figure 2:
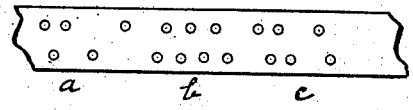

Figure 1 is a diagrammatic view; Fig. 2, a detail view of a section of a transmitting-ribbon having perforations arranged in a manner which I prefer.

E indicates the earth connection. The drum of the receiver may be of non-conducting material and is so indicated. Bearing upon it are two fingers or styluses insulated from each other, one of iron or other suitable corrosive metal and the other of platinum or suitable non-corrosive metal. Between the drum and fingers the chemically-prepared receiving-tape passes. The iron finger is in electrical connection with one side of the circuit and the platinum finger with the other side. Were the drum of conducting material, in which case it should preferably be of non-corrosive metal, it might be connected in the circuit and the platinum finger dispensed with. These connections may be reversed. They are shown as they are because in the diagram the transmitted positive impulses are to produce the record. At the transmitting-station a perforated transmitting-tape is indicated as passing between two upper contact-fingers electrically connected to each other and also to one side of the circuit and in the special example depicted in the illustration to that side with which the marking or recording finger of the receiver is in electrical connection. Beneath the transmitting-tape and respectively opposite the two upper contacts are two contact-fingers, one connected with the positive pole of the source of energy and the other with the negative pole, and in the latter connection is interposed a variable resistance. The upper and lower contact-fingers press toward each other and are separated electrically by the transmitting-tape except when perforations therein are coincident with their respective ends. The perforations in the tape indicate the letters "a, b, c" of the Morse code. In transmission of a signal first a positive impulse passes from the source of energy and next a negative impulse. That is the regular sequence. The capacity and consequent retardation of the line cause the electrochemical or corrosive action at the receiving-finger, due to the initial signal impulse, to continue after disconnection of the battery from the circuit and until such action is arrested by a succeeding impulse of opposite polarity. If the circuit has not sufficient capacity to produce a proper record, it must be added by, for instance, introducing condensers, or the discharge of the line may be protracted by the use of electromagnetic retardation-coils. The interval between the two impulses is determined in the example depicted by the angular relation of the two corresponding perforations in the tape and by the speed of passage of the tape between the contact-fingers. The longer interval therefore produces a dash and the shorter one a dot on the receiving-ribbon, and no other marking on such ribbon is produced, the second impulse of reverse polarity not producing any mark at the non-marking finger of the receiver or being manifested in any way except by its termination of the dot or dash being produced on the receiving-ribbon.

I have discovered that a heavier record without too great sacrifice of definition may be obtained under some conditions by creating a discrepancy in the strength of the two impulses constituting a signal—*i. e.*, making the initial or recording impulses stronger than the second or signal-terminating impulse. This may be conveniently accomplished by introducing the adjustable resistance in the negative connection from the battery or generator at the transmitting-station. A circuit having relatively low capacity considering the requirements of this invention will admit of a closer equalization of strength of the two impulses than a circuit having relatively great capacity. By adjusting the resistance in the negative-current lead the most favorable conditions for any given circuit may readily be obtained.

I claim as my invention—

1. In a telegraph system in which each signal is composed of two impulses of opposite polarity sent into a circuit at a transmitting-station, the method of transmission and recording which consists in adjusting the capacity or consequent retardation effect of the circuit so that the formation of a record character will be continued after its primary impulse is sent into the circuit, sending the primary impulse of a signal into the circuit to initiate the production of a record thereof, disconnecting the generator from the circuit and permitting the "capacity" effects of the circuit to continue the production of said character, and terminating the formation of the character by transmitting the secondary impulse of opposite polarity.

2. In a telegraph system in which each signal is composed of two impulses of opposite polarity sent into a circuit at a transmitting-station, the method of transmission and recording which consists in adjusting the capacity or consequent retardation effect of the circuit so that the formation of a record character will be continued after its primary impulse is sent into the circuit, sending the primary impulse of a signal into the circuit to initiate the production of a record thereof, disconnecting the generator from the circuit and permitting the "capacity" effects of the circuit to continue the production of said character, terminating the formation of the character by transmitting the secondary impulse of opposite polarity, and preventing the production of a mark on the receiving-tape by the secondary impulse.

3. In a telegraph system in which each signal is composed of two impulses of opposite polarity sent into a circuit at a transmitting-station and in which all primary impulses are of equal duration and all secondary impulses of equal duration, the method of transmission and recording which consists in adjusting the capacity or consequent retardation effect of the circuit so that the formation of a record character will be continued after its primary impulse is sent into the circuit, sending the primary impulse of a signal into the circuit to initiate the production of a record thereof, disconnecting the generator from the circuit and permitting the "capacity" effects of the circuit to continue the production of said character, and terminating the formation of the character by transmitting the secondary impulse of opposite polarity.

4. In a telegraph system in which each signal is composed of two impulses of opposite polarity sent into a circuit at a transmitting-station and in which all primary impulses are of equal duration and all secondary impulses of equal duration, the method of transmission and recording which consists in adjusting the capacity or consequent retardation effect of the circuit so that the formation of a record character will be continued after its primary impulse is sent into the circuit, sending the primary impulse of a signal into the circuit to initiate the production of a record thereof, disconnecting the generator from the circuit and permitting the "capacity" effects of the circuit to continue the production of said character, terminating the formation of the character by transmitting the secondary impulse of opposite polarity, and preventing the production of a mark on the receiving-tape by the secondary impulse.

5. In a telegraph system in which each signal is composed of two impulses of opposite polarity sent into a circuit at a transmitting-station, the method of transmission and reception upon a chemically-prepared tape which consists in adjusting the capacity or consequent retardation effect of the circuit so that the formation of a record character upon the chemically-prepared tape will be continued after its primary impulse is sent into the circuit, sending the primary impulse of a signal into the circuit to initiate the production of a record on the tape by electrochemical action, disconnecting the generator from the circuit and permitting the "capacity" effects of the circuit to continue the production of said character, and terminating the formation of said character by the secondary impulse of opposite polarity.

6. In a telegraph system in which each signal is composed of two impulses of opposite polarity sent into a circuit at a transmitting-station, the method of transmission and reception upon a chemically-prepared tape which consists in adjusting the capacity or consequent retardation effect of the circuit so that the formation of a record character upon the chemically-prepared tape will be continued after its primary impulse is sent into the circuit, sending the primary impulse of a signal into the circuit to initiate the production of a record on the tape by electrochemical action, disconnecting the generator from the circuit and permitting the "capacity" effects of the circuit to continue the production of said character, terminating the formation of said character by the secondary impulse of opposite polarity and preventing the production of a mark on the receiving-tape by the secondary impulse.

7. In a telegraph system in which each signal is composed of two impulses of opposite polarity sent into a circuit at a transmitting-station and in which all primary impulses are of equal duration and all secondary impulses of equal duration, the method of transmission and reception upon a chemically-prepared tape which consists in adjusting the capacity or consequent retardation effect of the circuit so that the formation of a record character upon the chemically-prepared tape will be continued after its primary impulse is sent into the circuit, sending the primary impulse of a signal into the circuit to initiate the production of a record on the tape by electrochemical action, disconnecting the generator from the circuit and permitting the "capacity" effects of the circuit to continue the production of said character, and terminating the formation of said character by the secondary impulse of opposite polarity.

8. In a telegraph system in which each signal is composed of two impulses of opposite polarity sent into a circuit at a transmitting-station and in which all primary impulses are of equal duration and all secondary impulses of equal duration, the method of transmission and reception upon a chemically-prepared tape which consists in adjusting the capacity or consequent retardation effect of the circuit so that the formation of a record character upon the chemically-prepared tape will be continued after its primary impulse is sent into the circuit, sending the primary impulse of a signal into the circuit to initiate the production of a record on the tape by electrochemical action, disconnecting the generator from the circuit and permitting the "capacity" effects of the circuit to continue the production of said character, terminating the formation of said character by the secondary impulse of opposite polarity and preventing the production of a mark on the receiving-tape by the secondary impulse.

9. In a telegraph system in which each signal is composed of two impulses of opposite polarity sent into a circuit at a transmitting-station, the method of recording a signal which consists in initiating the record thereof by the primary impulse, continuing the production of the record by the "capacity" effects or "retardation" of the circuit after the source of current has been disconnected from the circuit and terminating the production or formation of the record by the secondary impulse of reverse polarity and preventing the production of a record of the secondary impulse.

10. In a telegraph system in which each signal is composed of two impulses of opposite polarity, sent into a circuit at a transmitting-station, all primary impulses being of equal duration and all secondary impulses of equal duration, the method of recording a signal which consists in initiating the record thereof by the primary impulse, continuing the production of the record by the "capacity" effects or "retardation" of the circuit after the source of current has been disconnected from the circuit and terminating the production or formation of the record by the secondary impulse of reverse polarity, and preventing the production of a record of the secondary impulse.

11. In a telegraph system in which each signal is composed of two impulses of opposite polarity sent into a circuit at a transmitting-station, the method of recording a signal which consists in initiating the record thereof by the primary impulse, continuing the production of the record by the "capacity" effects or "retardation" of the circuit after the source of current has been disconnected from the circuit, terminating the production or formation of the record by the secondary impulse of reverse polarity and less strength than the primary impulse.

12. In a telegraph system in which each signal is composed of two impulses of opposite polarity sent into a circuit at a transmitting-station, all primary impulses being of equal duration and all secondary impulses of equal duration, the method of recording a signal which consists in initiating the record thereof by the primary impulse continuing the production of the record by the "capacity" effects or "retardation" of the circuit after the source of current has been disconnected from the circuit, and terminating the production or formation of the record by the secondary impulse of reverse polarity and less strength than the primary impulse.

13. In a telegraph system in which each signal is composed of two impulses of opposite polarity sent into a circuit at a transmitting-station, the method of transmission and reception upon a chemically-prepared tape, which consists in sending the primary impulse of a signal into the circuit to initiate the production of a record on the tape by electrochemical action, disconnecting the generator from the circuit and permitting the "capacity" effects or "retardation" of the circuit to continue the production of said character, and terminating the production of the record by the secondary impulse of reverse polarity and preventing the production of a mark on the receiving-tape by the secondary impulse.

14. In a telegraph system in which each signal is composed of two impulses of opposite polarity sent into a circuit at a transmitting-station, all primary impulses being of equal duration, the method of transmission and reception upon a chemically-prepared tape, which consists in sending the primary impulse of a signal into the circuit to initiate the production of a record on the tape by electrochemical action, disconnecting the generator from the circuit and permitting the "capacity" effects or "retardation" of the circuit to continue the production of said character, and terminating the production of the record by the secondary impulse of reverse polarity and preventing the production of a mark on the receiving-tape by the secondary impulse.

15. In a chemical telegraph system in which the records of the signal are initiated by transmitted impulses of current of equal duration and the "capacity" or "retardation" of the circuit utilized for formation of the record characters upon the chemically-prepared tape, the method of operation which consists in sending the primary impulse of each signal into the circuit to initiate the production of the record thereof by electrochemical action, disconnecting the transmitting-generator from the circuit and permitting the "capacity" or "retardation" effects of the circuit to cause a continuation of the production of said character and finally terminating the formation of the character by the secondary impulse of opposite polarity, the interval of time between the primary and secondary impulses determining whether the recorded signals are dots or dashes.

In testimony whereof I have hereunto subscribed my name.

PATRICK B. DELANY.

Witnesses:
ROMYN HITCHCOCK,
H. LEE SELLERS.